United States Patent [19]
Wood

[11] Patent Number: 6,106,733
[45] Date of Patent: Aug. 22, 2000

[54] METHOD FOR RE-CYCLING WELLBORE CUTTINGS

[75] Inventor: Bradford R. Wood, Kingwood, Tex.

[73] Assignee: Tuboscope Vetco International, Inc., Houston, Tex.

[21] Appl. No.: 09/104,820

[22] Filed: Jun. 25, 1998

[51] Int. Cl.⁷ .................................................. E21B 21/06
[52] U.S. Cl. ........................... 210/774; 210/806; 175/66; 175/206
[58] Field of Search ............................... 166/265; 175/66, 175/206; 210/768, 770, 774, 800, 803, 804, 805, 806

[56] References Cited

U.S. PATENT DOCUMENTS

| | | | |
|---|---|---|---|
| D. 296,027 | 5/1988 | Dietzen | D34/39 |
| D. 337,809 | 7/1993 | Dietzen | D23/202 |

(List continued on next page.)

OTHER PUBLICATIONS

Tuboscope Is Your Single Resource For Best–In–Class Oilfield Services, Tuboscope, 1997.
Technical Information, On Site Technology LLC, 1995.
A revolutionary cost–effective on location solution to soil remediation, Onsite Technology LLC, 1997.
"Sweco Oilfield Services, A Division of Environmental Procedures, Inc.," Environmental Procedures, Inc., 1995.
"Separation Through Technology—Composite Catalog," Brandt EPI, Feb. 1996.
"New Technology In Automated Wastewater Systems," Environmental Procedures, Inc., 1996.
"Fluid Processing Equipment For the Drilling & Environmental Industries," Tri–Flo Int'l Inc., 1996.
"Pressure Control Solids Control Rig Instrumentation," Swaco Geolograph, Dec. 1993.

*Primary Examiner*—David A. Reifsnyder
*Attorney, Agent, or Firm*—Finnegan, Henderson, Farabow, Garrett & Dunner, L.L.P.

[57] ABSTRACT

A method for remediating cuttings from a wellbore has been invented which, in certain aspects, includes transporting a system for remediating the cuttings to an offshore rig in transportable containers, the system including a thermal treatment system and a condensing system; feeding a slurry of the cuttings with oil and water to the thermal treatment system and heating the cuttings therein producing heated cuttings an a stream with oil and water; discharging the heated cuttings from the thermal treatment; feeding the stream with oil and water to a condenser system producing a liquid stream; and feeding the liquid stream to an oil/water separator producing an oil stream and a water stream. In another method for remediating cuttings according to the present invention, the method includes feeding a slurry of the cuttings with oil, fine particulates, and water to a thermal treatment system and heating the cuttings therein producing heated cuttings and a stream with oil and water, discharging the heated cuttings from the thermal treatment, feeding the stream with oil and water to the filter system, filtering out fine particulates from the stream with oil and water, feeding the stream with oil and water to a condenser system producing a liquid stream, and feeding the liquid stream to an oil/water separator producing an oil stream and a water stream.

19 Claims, 5 Drawing Sheets

U.S. PATENT DOCUMENTS

| | | | |
|---|---|---|---|
| 1,125,413 | 1/1915 | Van Doren . | |
| 2,803,501 | 8/1957 | Kelly | 302/17 |
| 2,961,154 | 11/1960 | Bergey | 494/1 |
| 3,070,291 | 12/1962 | Bergey . | |
| 3,192,155 | 6/1965 | Bready et al. | 210/705 |
| 3,400,819 | 9/1968 | Burdyn | 175/66 |
| 3,433,312 | 3/1969 | Burdyn et al. | 175/66 |
| 3,502,215 | 3/1970 | Cahan . | |
| 3,515,507 | 6/1970 | Estabrook . | |
| 3,899,414 | 8/1975 | Hansen | 209/17 |
| 3,993,359 | 11/1976 | Sweeney | 302/15 |
| 4,019,641 | 4/1977 | Merz | 214/14 |
| 4,030,558 | 6/1977 | Morris | 175/39 |
| 4,139,462 | 2/1979 | Sample, Jr. | 175/206 |
| 4,211,652 | 7/1980 | Thomas | 210/44 |
| 4,546,783 | 10/1985 | Lott | 134/109 |
| 4,595,422 | 6/1986 | Hill et al. | 134/19 |
| 4,634,535 | 1/1987 | Lott | 210/780 |
| 4,683,963 | 8/1987 | Skinner | 175/66 |
| 4,793,423 | 12/1988 | Knol | 175/66 |
| 4,878,576 | 11/1989 | Dietzen | 198/494 |
| 4,942,929 | 7/1990 | Malachosky et al. | 175/66 |
| 5,016,717 | 5/1991 | Simons et al. | 175/66 |
| 5,030,356 | 7/1991 | Blume et al. | 210/640 |
| 5,088,856 | 2/1992 | Yocum | 405/128 |
| 5,109,933 | 5/1992 | Jackson | 175/66 |
| 5,124,049 | 6/1992 | Maness | 210/715 |
| 5,190,085 | 3/1993 | Dietzen | 141/98 |
| 5,322,393 | 6/1994 | Lundquist | 406/38 |
| 5,341,856 | 8/1994 | Appenzeller | 141/67 |
| 5,344,570 | 9/1994 | McLachlan et al. | 210/209 |
| 5,402,857 | 4/1995 | Dietzen | 175/66 |
| 5,439,489 | 8/1995 | Scalliet et al. | 44/281 |
| 5,564,509 | 10/1996 | Dietzen | 175/66 |
| 5,641,071 | 6/1997 | Read et al. | 209/319 |
| 5,772,901 | 6/1998 | Yu et al. | 210/788 |

METHOD FOR RE-CYCLING WELLBORE CUTTINGS

BACKGROUND OF THE INVENTION

1. Field of the Invention

The present invention is directed to systems for treating and re-cycling wellbore drilling cuttings, and, in one aspect, to such systems for offshore drilling rigs.

2. Description of Related Art

Drilling fluids used in hydrocarbon well drilling, as well known in the prior art, pick up solid cuttings and debris which must be removed if the fluid is to be re-used. Drilling fluid, called "mud," is typically either water based or oil-based. Typically a mud with various additives is pumped down through a hollow drill string (pipe, drill collar, bit, etc.) into a well being drilled and exits through holes in a drillbit. The mud picks up cuttings (rock), other solids, and various contaminants, such as, but not limited to, crude oil, water influx, salt and heavy metals from the well and carries them upwardly away from the bit and out of the well in a space between the well walls and the drill string. At the top of the well, the contaminated solids-laden mud is discharged over a shale shaker which has a series of screens that catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

FIG. 3 discloses one example of a typical prior art system, land-based or offshore, (e.g. as shown in U.S. Pat. No. 5,190,645). A well is being drilled by a bit carried on a string of drill pipe as drilling mud is pumped by a pump into the drill pipe and out through nozzles in the bit. The mud cools and cleans the cutters of the bit and then passes up through the well annulus flushing cuttings out with it. After the mud is removed from the well annulus, it is treated before being pumped back into the pipe. The mud enters a shale shaker where the relatively large cuttings are removed. The mud then enters a degasser where gas can be removed if necessary. The degasser may be automatically turned on and off, as needed, in response to an electric or other suitable signal produced by a computer and communicated to degasser. The computer produces the signal as a function of data from a sensor assembly associated with shale shaker. The mud then passes to a desander and (or a desilter), for removal of smaller solids picked up in the well. In one aspect, the mud next passes to a treating station where, if necessary conditioning media, such as barite, may be added. Suitable flow controls e.g. a valve, control the flow of media. The valve may be automatically operated by an electric or other suitable signal produced by the computer as a function of the data from sensor assembly. From the treatment station, the mud is directed to a tank from which a pump takes suction, to be re-cycled through the well. The system shown is exemplary; additional components of the same types (e.g. additional treatment stations) or other types (e.g. centrifuges) are be included.

Remediation of cuttings on-site at an offshore rig is a difficult and expensive operation. It is known to have removed cuttings from a fluid in a barge to a land-based facility. This involves expensive and excessive handling which can result in a serious negative impact on the environment in the event of an accident or spill.

Several prior art systems which treat fluids or cuttings leave a relatively high oil content on the cuttings.

Thermal desorption processes are well known for remediating contaminated soil, both indirect processes in which material is isolated from flame and heat is applied above the vaporization temperature of a contaminant and direct process in which material is directly heated with a flame. Often in direct processes, VOC's are destroyed by direct flame contact and a portion of them may be thermally destroyed in a downstream oxidizer.

There has long been a need for an effective and efficient system for treating drilling fluids on offshore rigs. There has long been a need for such systems that produce an environmentally safe fluid which can be re-cycled without the need for treatment off site.

SUMMARY OF THE PRESENT INVENTION

The present invention discloses, in certain embodiments, a wellbore cuttings remediation system that separates cuttings from a wellbore drilling mixture and then treats the cuttings to produce acceptably disposable material and recyclable fluid. Such systems may be land-based or configured for offshore use. A wellbore drilling mixture may contain cuttings, oil, water, and diesel and other contaminants. Typically drilled cuttings are about 15% to about 25% contaminants by volume, or higher. In one embodiment a system according to the present invention has a dryer subsystem and a condenser subsystem.

The dryer subsystem, in one aspect, has a feed system, a classification system, and a heater dryer. Input cuttings are fed to a hopper and/or shredder. Pieces of acceptable size are then fed to the heater dryer (wherein certain contaminants, including but not limited to hydrocarbon contaminants, are vaporized and/or volatilized in an environmentally acceptable manner. In one aspect, a resulting gas stream is recaptured and condensed. In one preferred embodiment, the condensed stream is stored and/or recycled within the system. In another aspect, it is disposed of. Sterile material from the dryer may, if desired, be re-hydrated and/or discharged overboard from an offshore rig. Alternatively, the sterile material may be shipped from the rig.

The condenser subsystem processes the exhaust gas stream produced by heating and volatilizing of the material in the heater dryer. A filter (e.g. but not limited to a baghouse filter) removes fines such as dust and other fine particulates from a stream flowing from the thermal treatment system to the oil/water separator to prevent such particulates from remaining in an oil stream produced by the oil/water separator and/or from an exhaust stream, producing a clean discharge. The liquid exhaust stream from the condenser may be processed in an oil/water separator to remove oil and water. Any suitable known oil/water separator may be used, including, but not limited to, a ceramic chip coalescer separator from Prodecon Company. A suitable typical blower or air mover may be used to pull the stream from the heater dryer to through a baghouse filter to the condenser and oil/water separator. Recovered water is used for, inter alia, re-hydration of cuttings or added to the drilling fluid. Recovered oil is used to fire burners, or as a mud additive. Recovered oil can be used to fire the heater dryer. The oil/water separator may have an exhaust that is fed to a burner and/or to an exhaust stack.

In one embodiment, a cuttings treatment system according to the present invention removes hydrocarbon contaminates ranging from fuel oils/short chain hydrocarbons to heavy oils/long chain hydrocarbons. The system, in one aspect, uses stainless steel a heater dryer with alloy triple drum dryer shells (U.S. Pat. No. 5,088,856) with higher material discharge temperatures and, via primary heat exchangers reduces temperature gases exiting a dryer. The equipment can process a wide range of material sizes from clay to 3" rock. The throughput capacity range of one embodiment is from 15 tons per hour (TPH) for a 7' dryer diameter plant to 30 TPH for a 9' dryer diameter plant.

Contaminated materials including cuttings and soil are weighed, and placed into a holding hopper equipped with a variable speed feeder which meters the material into an auger which transports the material to a rotary dryer. The dryer unit, in one aspect, dries and heats the contaminated material either directly or, alternatively, indirectly so that hot gases and/or flames do not come in contact with it or with the hydrocarbon/water gas stream. Temperature is increased to vaporize the water and hydrocarbons in the material; also a relatively small portion may be burned off. The water and hydrocarbon stream is filtered, e.g. with a baghouse filter to remove undesirable particulates. This stream is fed to an oil/water separator that produces a stream of hydrocarbons and a stream of water. The water may be re-used in the system. Further air pollution control can, optionally, be added such as HEPA filters and acid gas scrubbers.

To effect vaporization of the water and hydrocarbons from the material while in the dryer, the material is heated to temperatures required to vaporize those water and hydrocarbon constituents. These temperatures are typically between 500° F. and 900° F. Material leaving the dryer is mixed with water for cooling and added moisture.

Either indirect or direct fired dryers may be used. The use of indirect dryers (vs. direct convection type dryers) allow for higher hydrocarbon contamination in the material to be treated. Typical convection dryers have operational limits between 3% and 5% hydrocarbon contamination in the material to be treated. Also, some indirect dryers do not combine the dryer burner by-product of combustion gas with steam and sweep gas, reducing the size of the condensing and particulate collection equipment.

In both stationary and portable recycling systems according to certain embodiments of the present invention hydrocarbon contaminates and water in material in a rotary dryer is treated at temperatures between 300° F. and 900° F. The hydrocarbons and water are drive off and condensed in primary and secondary heat exchangers. Material is discharged as remediated from the dryer. Discharge from the primary heat exchanger is ducted to a secondary air to water heat exchanger which splits the mass into water/hydrocarbon and sweep gas. Water and hydrocarbons pass through one or more oil/water separators, typically, cleaning water to 15 parts per million. Oil is captured and recycled. The level of residual hydrocarbon contamination in the material after such remediation is typically in the range of 0–20 ppm. Cleaned material and soils are then recycled in numerous ways: re-use in original product, back-fill at the site of origin, reclaiming soil or coal pits, general clean fill, crushed soil sales, asphalt mix sales, concrete mix sales, or cover in a sanitary landfill.

In one aspect, a soil recycling facility has on-site laboratory equipment to validate that the soils are properly remediated along with proper storage arrangements for the materials awaiting processing. A remediation plant according to the present invention may include: material holding hoppers, material handling conveyors and equipment, rotary dryer, soil conditioner (adding water), primary heat exchanger, secondary heat exchanger, primary oil/water treatment, secondary oil/water treatment, particulate collection, and controls. Advantages of such systems include: Complete remediation and recycling of the soil; Removal and recycling of hydrocarbons; High levels of hydrocarbon removal and state-of-the-art pollution control; A reliable and cost effective option to landfill disposal; Allows the reuse of the remediated soil, water, and hydrocarbons in a variety of ways; Provides certification of remediation of hydrocarbon contaminated soils; Ability to process a wide variety of types of cuttings, soils and hydrocarbons; Maintenance of the ambient air quality standards.

In one aspect portable remediation systems according to the present invention uses a two, three, or four tractor trailer load design with feeder bin, dryer, heat exchangers, baghouse, and controls all on portable frames. Production rates are in the 15 to 30 ton-per-hour range for high moisture soils. A grizzly unit over the top of a bin of the cold feed hopper is self-relieving via vibration or remote actuation dump. As an end loader charges the cold feed bin, large clay balls and large pieces of rubble do not go into the bin and are automatically discharged to the ground. Clay shredding and oversized rock crushers may be used.

High moisture in contaminated soil is considered to be between 15% and 25% moisture by weight in the soil to be remediated. A 7' diameter dryer is run between 10 and 15 tons per hour contaminated soil. A 9' diameter dryer is run between 20 and 30 tons per hour. Actual production depends on such variables as the specific heat of the soil, elevation of the plant, and the amount of moisture to be removed.

Systems according to the present invention may be affected by state and country permit criteria. Maximum volumes of criteria pollutants from portable or stationary systems allowed by individual states and county air regulators affect the size of the dryer. Acid such as sulfur oxide output from the stack may require a switch to low sulfur primary fuel and/or addition of a packed tower. Particulate collection beyond 0.04 GSCF may require HEPA filters. Liquid or vapor carbon collection for water and gas may be required.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful, unique, efficient, non-obvious systems and methods for remediating cuttings from drilling fluids on land-based or offshore drilling rigs;

Such systems and methods that produce re-cyclable drilling fluids;

Such systems and methods that, on the rig, remove contaminants from cuttings from drilling fluids; and Such systems and methods that produce re-usable water and oil.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DESCRIPTION OF EMBODIMENTS
PREFERRED AT THE TIME OF FILING FOR
THIS PATENT

Figure 1:
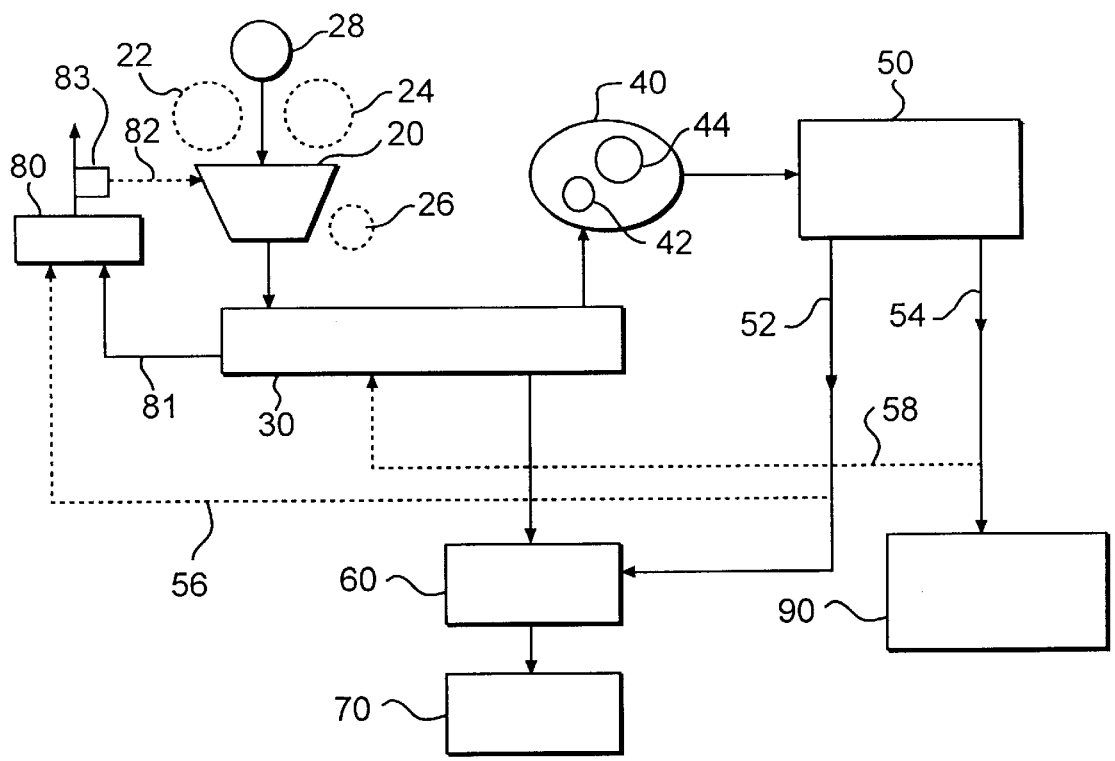
FIG. 1 is a schematic view of a system according to the present invention.

As shown in FIG. 1, one particular embodiment of a system 10 according to the present invention has a feed hopper 20; a dryer 30; a condenser 40; an oil/water separator 50; a rehydration system 60; a discharge 70; an exhaust stack 80; and an oil processor 90. In one particular aspect all of the major components are sized for containment in two containers which, when stacked, occupy a volume 8½'×20'×20'. By using stackable containers the system's "footprint" on an offshore rig. where space is at a premium, is minimized. In one aspect the container weight is low enough for helicopter transport.

Initially, cuttings in a drilling fluid are processed by a rig's shaker system, producing fluid, soil, and oily contaminated cuttings and solids (collectively "oily solids"). These oily solids in a slurry of solids, oil and water are fed to the feed hopper 20 (e.g. from: an end loader; conveyor belt; auger; vacuum system from the shakers; mud cleaner, hydrocyclone and/or centrifuge).

The feed hopper may include appropriate crushers, shredders, and/or classifiers. A "grizzly unit" (i.e. a screening system with relatively large openings) may be used positioned over the top of the feed hopper. The grizzly unit removes large clay balls and/or large pieces of rubble which are sent to a shredder. Optionally, separate clay shredders (item 22 in dotted line) and/or oversized rock crushers (item 24 in dotted line) may be used to treat input to the feeder hopper. Also optionally, a heater (item 26 in dotted line) may be used to heat material in the feed hopper 20 (e.g. up to a temperature of about 212° F.) to drive off water in the feed material.

The dryer 30 heats the oily solids to vaporize or volatilize hydrocarbons and other organic contaminants. A variety of dryers are commercially available for this purpose, including, but not limited to, Brandt multiple drum dryers that hold an amount of material and have a gas fired burner or burners that can produce heat up to 1400° F. Any suitable dryer and/or heater may be used, including, but not limited to, commercially available thermal screw dryers, rotating drum dryers, and rotating screws within drum dryers. Available fuels for the dryer includes propane, natural gas, diesel fuel, or electric power. Actual process temperatures are established depending on the vaporization and/or volatilization temperature of contaminants to be removed.

In one particular embodiment of the present invention, the system 10 processes about 2 tons per hour of a material that contains by volume up to about 25% oil, up to about 25% water, and up to about 50% drilled solids. These percentages may vary in certain embodiments of the present invention by 95%, plus or minus. Processed tons per hour may vary depending on specific heat of the material to be processed, elevation of the rig, and amount of moisture to be removed.

Solid treated material, including but not limited to sterile soil and/or sterile debris, is fed to the rehydration system 60. Water (including, but not limited to, water from the oil/water separator 50) is added to the sterile material to control dust during handling and/or discharge of the sterile material. If permitted, the discharge 70 directs the material overboard from an offshore rig. Alternatively, the discharge 70 conducts the material to a boat, barge, or container.

The rehydration system 60 may be any suitable commercially available rehydrator, including, but not limited to, suitable rehydration chambers, auger systems and pug mills. Fine mist sprays may be used with or in any such system. A variety of commercially available prior art nozzle spray systems may be used.

The heater dryer 30 exhausts a vapor stream with oil and water to the condenser 40. A filter subsection 42 before the condenser filters out contaminating fines, e.g. particles with a smallest dimension of 0.4 microns. A heat exchange subsystem 44 cools the vapor, e.g. down to 100° F. or lower. In one aspect the heat exchange system is a typically plate/fin system and the heat exchange medium is air pumped by fans. The cooled vapor liquid stream (preferably with most or all fines removed) is then pumped to the oil/water separator 50.

The oil/water separator 50 separates the feed from the heat exchange subsystem 44 into a water stream 52 which, in one aspect, is fed to the rehydration system 60; and an oil stream 54 which, in one aspect is fed to the oil processor 90. The oil processor 90 sends the oil from the oil/water separator 50 to storage on the rig; to shipping containers; to a mud additive system; and/or to fuel tanks, e.g. but not limited to, for use as fuel for the heater dryer. Any suitable known oil/water separator may be used. Alternatively, the water stream is returned to the drilling fluid or, in a line 56, for evaporation in the exhaust stack 80. Alternatively, the oil is returned in a line 58 to the heater dryer 30.

Figure 2:
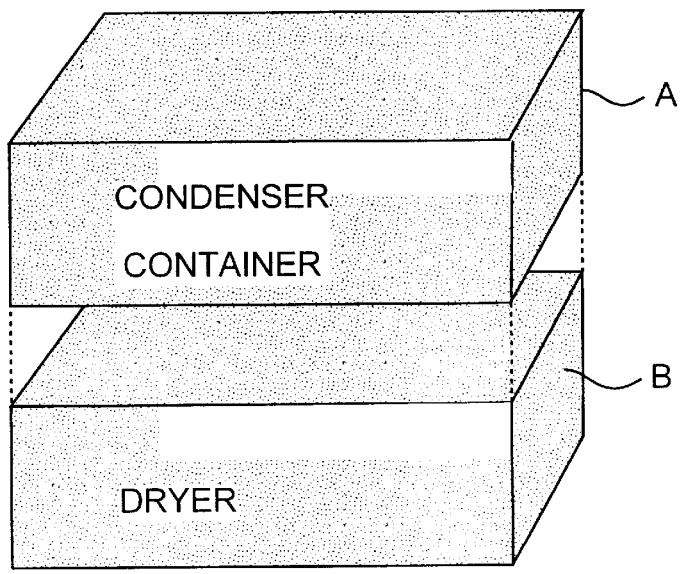
FIG. 2 is a schematic perspective view of a system according to the present invention.
Figure 3:
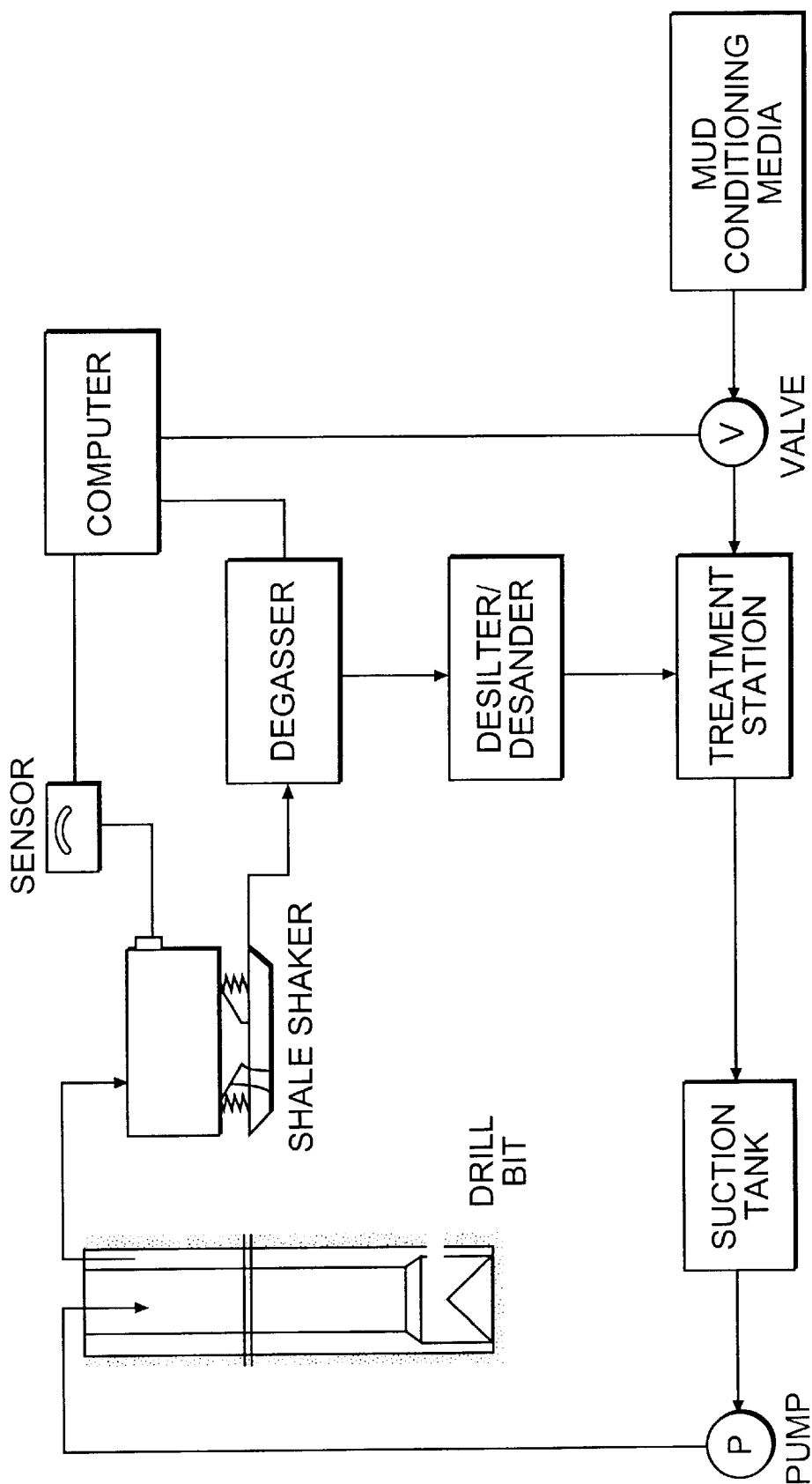
FIG. 3 is a schematic view of a prior art system.

Heat and exhaust from burners of the heater dryer 30 in a line 81 vents through the exhaust stack 80. Steam and/or hot fluid may be provided in a line 82 to the feed hopper 20 to heat its contents from a heat exchange system 83 which, in certain aspects, has a closed loop fluid flow coil inside and/or outside of the stack 80 disposed in heat exchange relationship to the hot stack exhaust FIG. 2 shows schematically the components of a system like the system 10 in two containers A and B. The container A contains the condenser system 40, including the filter subsection 42, the heat exchanger 44 and the oil/water separator 50. The container B contains the heater dryer 30 and the feed hopper 20. In one particular aspect the containers A and B and their contents weigh 25,000 pounds or less and, in one preferred aspect, about 20,000 pounds or less. Each containers dimensions, in one aspect, are 8½'× 20'×10' so that together they occupy a volume 8½'×20'×20'. These modules (A and B) may be stacked and held together by interlocking pins or other suitable holding members or straps. In one aspect each container weighs between 18,000 and 22,000 pounds. It is preferred that the containers are sized so that their footprint (including the footprint of multiply stacked containers) on the rig is no more than 10'×25', more preferably no more than 9'×22' and, in one aspect 8½'×20'.

Figure 4:
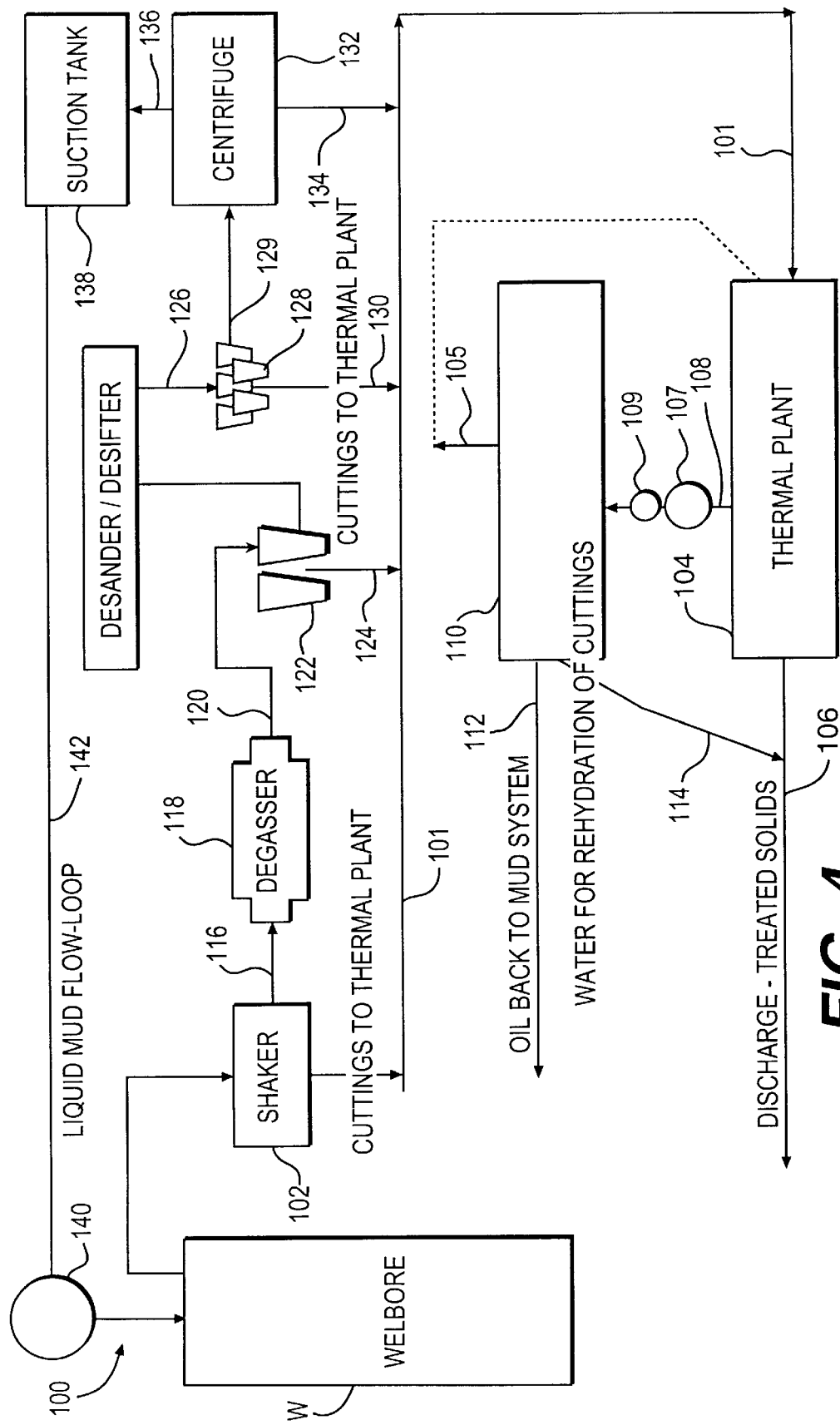
FIG. 4 is a schematic view of a system according to the present invention.

FIG. 4 shows a system 100 according to the present invention in which cuttings, debris, material, soil and fluid from a drilling operation in a wellbore W are conveyed to a shaker system 102. Separated oily solids (cuttings, soil, etc.) are conveyed with a conveyor in a stream 101 (a pump may be used) to a thermal treatment system 104. The thermal treatment system produces a discharge 106 of treated solids suitable for disposal and a stream 108 containing liquids (e.g. oil and water). The stream 108 is fed through a baghouse filter 107 pulled by a blower 109, to an oil/water separator 110 that produces a stream 112 of oil and a stream 114 of water which is fed to the stream 106 to re-hydrate the treated solids. Alternatively, instead of the stream 112, the oil (some or all) is fed in a line 105 back to the thermal treatment system 104 to fire its burners and/or some or all of it is recycled.

Material from the shaker system 102 other than cuttings, etc. including, e.g., liquid drilling fluid, barite, bentonite, etc., in a stream 116 is processed in a degasser 118 which degasses the stream 116. The degassed stream 120 flows to a desander 122 that produces a stream of solids 124 that is conveyed (e.g. augered or pumped) into the stream 101 for movement to the treatment system 104 and a stream of liquid, etc. 126 that flows to a desilter 128. The desilter 128 produces a stream of solids 130 that is conveyed (e.g. augered or pumped) to the stream 101 and then to the thermal treatment system 104 and a stream 129 of liquid, etc., that is conveyed (e.g. augered or pumped) to a centrifuge 132. The centrifuge 132 produces a stream of solids 134 that is conveyed (e.g. augered or pumped) to the stream 101 and then to thermal treatment system 104 and a stream of liquids 136, etc. that flows to a suction tank 138. A pump or pumps (e.g. but not limited to triplex pumps) 140 creates the suction for the tank 138 and pumps the liquid, etc. back into the wellbore W in a line 142. The liquid in line 142 may contain water, barite, oil, bentonite, other fluid additives, etc.

Figure 5:
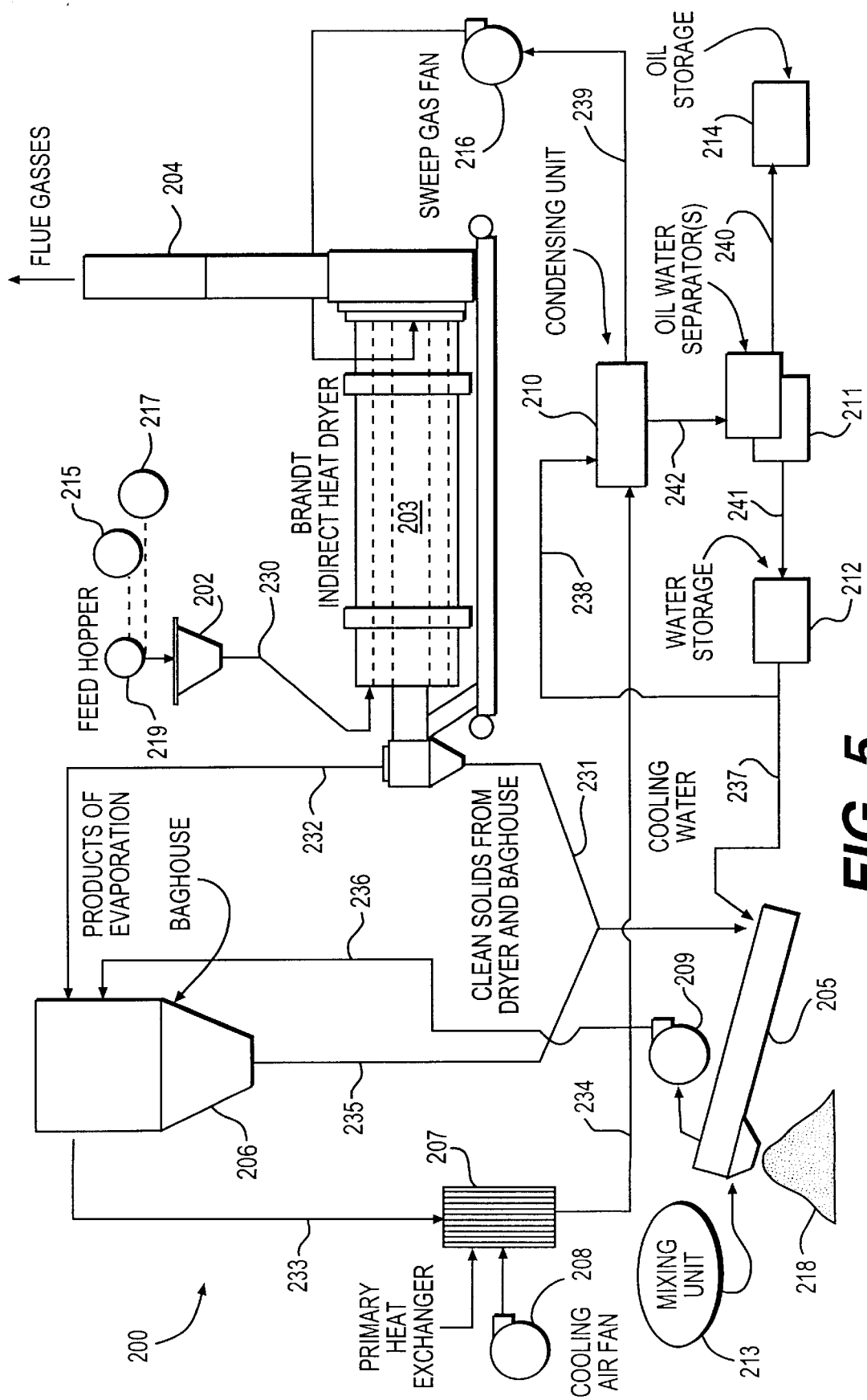
FIG. 5 is a schematic view of a system according to the present invention.

FIG. 5 shows a system 200 according to the present invention. A mixture of liquid, cuttings, etc. from a wellbore is fed to a hopper 202 from which it flows in a line 230 to a thermal treatment system 203 (e.g. any such system previously described herein and including, but not limited to, any suitable commercially available indirect or direct fired dryer system). An optional grizzly unit 219 may be used over the hopper 202 which is preferably self-relieving (e.g. via vibration) and/or has a remotely actuable dump apparatus. Thus as an end loader changes the feed hopper 202 (which in one aspect is "cold") large clay balls and large pieces of rubble are discharged (e.g. to the ground) instead of entering the hopper 202. An optional clay shredder 215 and/or rock crusher 217 may be used.

The thermal treatment system 203 produces an exhaust stream that is exhausted through a flue 204; a stream of solids 231 that is fed to rehydration apparatus 205; and a stream of gasses 232 that is fed to a baghouse filter system 206 for removal of fine particulates. Optionally, the cuttings in the line 231, which may be relatively hot are mixed with water in a mixing unit 213 and then fed to rehydration apparatus 205. The rehydration apparatus 205 produces a mass 218 of separator solids. Dust and steam in a line 236 propelled by a blower or fan 209 is introduced to the baghouse filter system 206 contains sterile dirt and water. Augers or other suitable conveyors move the cuttings through the system; e.g. from the hopper 202 to the system 203; from it to the rehydration apparatus 205; from the rehydration apparatus 205 to the system 206. Preferably, the system 205 is a sealed system.

Solid particulates from the baghouse filter system 206 flow in a line 235 to the rehydration apparatus 205 and gasses flow in a line 233 to be cooled in a heat exchanger 207 e.g. down to about 100 degrees F. A cooling fan 208 provides cool air to the heat exchanger 207. The cooled gasses and liquid flow in a line 234 to a condensing unit 210 which produces an exhaust gas stream 239 that flows back to the thermal treatment system 203, propelled by a fan 216; and a liquid stream, e.g. with oil and water therein, that flows in a stream 242 to one or more oil/water separators 211.

Water produced by the oil water separator 211 flows in a line 241 to a water storage apparatus 212 and produced oil flows in a line 240 to an oil storage apparatus 214.

Water from the water storage apparatus 212 may be re-cycled in a line 238 to the condensing unit 210 and/or fed in a line 237 for use in the rehydration apparatus 205. The system 200 may be land-based or used on an offshore rig.

Figure 6:
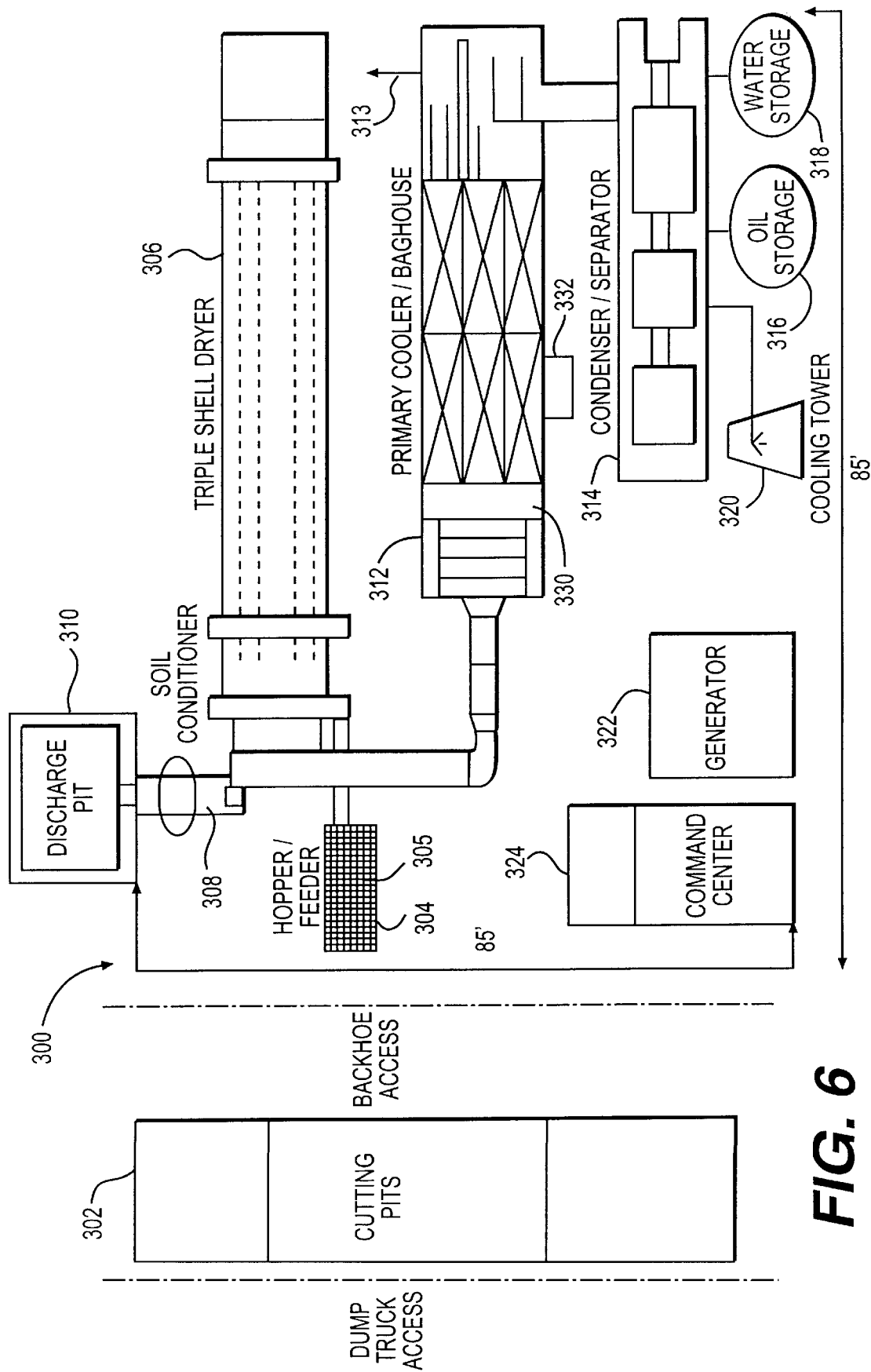
FIG. 6 is a schematic view of a system according to the present invention.

FIG. 6 shows a land-based system 300 according to the present invention. Cuttings, liquid, etc. from cuttings pits 302 having both dump truck access (for trucks to dump material in from a wellbore; alternatively a pump/conduit system may be used) and backhoe access (for backhoes to charge a hopper feeder 304; alternatively a pump/conduit system may be used) are fed to the hopper feeder 304 from which they are conveyed to a thermal dryer 306. An optional grizzly unit or other suitable pre-screening apparatus (e.g. a shaker) 305 may be used on the feeder hopper 304 (as is the case with any embodiment disclosed herein). The dryer 306 (e.g. any thermal treatment system disclosed herein) produces solids which are fed to a soil conditioner 308 which rehydrates the solids and whose output conditioned material is fed to a discharge pit 310. Liquid/gas material from the dryer 306 is fed to a cooling-filtering system 312 that produces a discharge stream 313 of filtered particulates and a stream of liquid that is fed to an oil condenser/water separator system 314. Oil produced by the system 314 is fed to oil storage apparatus 316 and produced water is fed to water storage apparatus 318. Gases from the system 314 are fed to a cooling tower 320 and may be re-used in a heat exchanger 330. An optional air pulse system 332 with an air compressor provides continuous air flow to or periodic compressed air pulses to the baghouse filter to knock fine particles therefrom.

A generator 322 provides power for various pumps, fans, and system components (e.g. electrical components and air compressors. All system components may be interconnected with and/or in communication with a command center 324 from which they may be controlled.

Various heli-transportable systems according to the present invention remediate 3–5 tons per hour of wellbore cuttings material. Various mobile systems (e.g. two/three tractor trailer loads) process 7–15 tons/hour. Larger systems (e.g. five/seven tractor trailer loads) process 20 to 30 tons/hour and large stationary systems process 50 to 100 tons per hour.

At a water content in the wellbore cuttings material of about 2%, in one aspect, an offshore unit according to the present invention can process about 5 tons/hour; a small mobile unit about 12 tons/hour; a mobile unit with a 7' diameter dryer, about 20 tons/hour; and a mobile unit with a 9' diameter dryer about 30 tons/hour. At about 20% water content, production is as follows: offshore unit, about 3.5 tons/hour; small mobile unit about 6.5 tons/hour; 7' dryer unit about 9.5 tons/hour; and 9' dryer unit about 20 tons/hour. At about 38% water content, production is as follows; offshore unit, about 1.2 tons/hour to 1.5 tons/hour; small mobile unit, about 2.4 tons/hour; mobile 7' dryer unit, about 4.0 tons/hour; and mobile 9' dryer unit, about 8.0 tons/hour.

The present invention, therefore, in at least certain preferred embodiments, provides a method for remediating wellbore cuttings on an offshore rig, the method including transporting a system for remediating the cuttings to the offshore rig in transportable containers, the system including a thermal treatment system and a condensing system, feeding a slurry of the cuttings with oil and water to the thermal treatment system and heating the cuttings therein producing heated cuttings volatilized oil and water, discharging the heated cuttings from the thermal treatment system, feeding the volatilized oil and water to a condenser system producing a liquid stream, and feeding the liquid stream to an oil/water separator producing an oil stream and a water stream; any such method wherein each transportable container weighs 25,000 pounds or less, or 20,000 pounds or less; any such method wherein the thermal treatment system is transported in a first container and the condenser system is transported in a second container; any such method including stacking the transportable containers on the offshore rig, and, particular aspect, stacking the transportable containers on the offshore rig so they occupy an area 10'×25' or less, or an area 8½'×20' or less; any such method wherein each transportable container is helicopter-transportable and the method including transporting the transportable containers by helicopter; any such method wherein an initial mixture of wellbore cuttings, oil, water and drilling fluid is fed to a shaker system, the method including producing the slurry of cuttings, oil and water with the shaker system; any such method including, prior to feeding the slurry to the thermal treatment system, feeding the slurry through a separator system to a hopper, separating large pieces of material from the slurry with the separator system, and then feeding the slurry from the hopper to the thermal treatment system; any such method wherein the slurry contains by volume up to about 25% oil, up to about 25% water, and up to about 50% cuttings and the method processes about 2 tons per hour of slurry; any such method wherein the slurry contains by volume about 38% water and the method processes about 1.2 tons per hour of slurry; any such method wherein the slurry includes fine particulates and the system includes a filter system for removing fine particulates, the method including prior to feeding the volatilized oil and water to the condenser system, feeding the volatilized oil and water to the filter system, and filtering out fine particulates from the volatilized oil and water; any such method wherein the slurry has hydrocarbon contaminants therein and the method includes volatilizing the hydrocarbons contaminants in the thermal treatment system to separate them from the slurry; any such method wherein wherein the slurry has volatilizable contaminants therein and the method includes volatilizing the volatilizable contaminants in the thermal treatment system to separate them from the slurry; any such method wherein the system includes heat exchange apparatus and the method includes cooling the liquid stream to 100° F. or lower prior to feeding it to the oil/water separator; any such method including feeding the oil stream from the oil/water separator to the thermal treatment system for fuel for the thermal treatment system; and any such method wherein the system includes rehydration apparatus and the method includes rehydrating the discharged heated cuttings with the rehydration apparatus to facilitate handling of the heated cuttings.

The present invention, therefore, in certain aspects, provides a method for remediating wellbore cuttings on an offshore rig, the method including transporting a system for remediating the cuttings to the offshore rig in transportable containers wherein each container weighs 20,000 pounds or less, the system including a thermal treatment system, a filter system, and a condensing system, stacking the transportable containers on the offshore rig so they occupy an area 10'×25' or less, feeding a slurry of the cuttings with oil, fine particulates, volatilizable contaminants and water to the thermal treatment system and heating the cuttings therein producing heated cuttings and a volatilized oil and water, and volatilizing the volatilizable contaminants in the thermal treatment system to separate them from the slurry, discharging the heated cuttings from the thermal treatment system, feeding the volatilized oil and water to the filter system, filtering out fine particulates from the volatilized oil and water, feeding the volatilized oil and water to a condenser system producing a liquid stream, and feeding the liquid stream to an oil/water separator producing an oil stream and a water stream.

The present invention, therefore, in certain aspects, provides a method for remediating wellbore cuttings from a wellbore, the method including feeding a slurry of the cuttings with oil, fine particulates, and water to a thermal treatment system and heating the cuttings therein producing heated cuttings and a volatilized oil and water, discharging the heated cuttings from the thermal treatment system, feeding the volatilized oil and water to a filter system, filtering out fine particulates from the volatilized oil and water, feeding the volatilized oil and water to a condenser system producing a liquid stream, and feeding the liquid stream to an oil/water separator producing an oil stream and a water stream.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A method for remediating cuttings on an offshore rig from a wellbore, the method comprising transporting a system for remediating the cuttings to the offshore rig in transportable containers, the system including a thermal treatment system and a condensing system, feeding a slurry of the cuttings, including large pieces of material, with oil and water to the thermal treatment system and heating the slurry to produce heated cuttings and volatilized oil and water, discharging the heated cuttings from the thermal treatment system, feeding the volatilized oil and water to a filter system to filter out fine particulates from the volatilized oil and water, feeding the volatilized oil and water from the filter system to a condenser system producing a liquid stream, and feeding the liquid stream to an oil/water separator producing an oil stream and a water stream.

2. The method of claim 1 wherein each transportable container weighs 25,000 pounds or less.

3. The method of claim 1 wherein each container weighs 20,000 pounds or less.

4. The method of claim 1 wherein the thermal treatment system is transported in a first container and the condenser system is transported in a second container.

5. The method of claim 1 further comprising stacking the transportable containers on the offshore rig.

6. The method of claim 1 further comprising stacking the transportable containers on the offshore rig so they each occupy an area 10'×25' or less.

7. The method of claim 1 further comprising stacking the transportable containers on the offshore rig so they each occupy an area 8½'×20' or less.

8. The method of claim 1 wherein each transportable container is helicopter-transportable and the method further comprising transporting the transportable containers by helicopter.

9. The method of claim 1 wherein an initial mixture of wellbore cuttings, oil, water and drilling fluid is fed to a shaker system, the method further comprising producing the slurry of cuttings, oil and water with the shaker system.

10. The method of claim 1 further comprising, prior to feeding the slurry to the thermal treatment system, feeding the slurry through a separator system to a hopper, separating large pieces of material from the slurry with the separator system, and then feeding the slurry from the hopper to the thermal treatment system.

11. The method of claim 1 wherein the slurry contains by volume up to about 25% oil, up to about 25% water, and up to about 50% cuttings and the method processes about 2 tons per hour of slurry.

12. The method of claim 1 wherein the slurry contains by volume about 38% water and the method processes about 1.2 tons per hour of slurry.

13. The method of claim 1 wherein the slurry has hydrocarbon contaminants therein and the method further comprising volatilizing the hydrocarbon contaminants in the thermal treatment system to separate them from the slurry.

14. The method of claim 1 wherein the slurry has volatilizable contaminants therein and the method further comprising volatilizing the volatilizable contaminants in the thermal treatment system to separate them from the slurry.

15. The method of claim 1 wherein the system includes heat exchange apparatus and the method further comprising cooling the liquid stream to 100° F. or lower prior to feeding it to the oil/water separator.

16. The method of claim 1 further comprising feeding the oil stream from the oil/water separator to the thermal treatment system for fuel for the thermal treatment system.

17. The method of claim 1 wherein the system includes rehydration apparatus and the method further comprising rehydrating the discharged heated cuttings with the rehydration apparatus to facilitate handling of the heated cuttings.

18. A method for remediating wellbore cuttings on an offshore rig, the method comprising transporting a system for remediating the cuttings to the offshore rig in transportable containers wherein each container weighs 20,000 pounds or less, the system including a thermal treatment system and a condensing system, stacking the transportable containers on the offshore rig so they occupy an area 10'×25' or less, feeding a slurry of the cuttings with oil, fine particulates, volatilizable contaminants and water to the thermal treatment system and heating the cuttings therein producing heated cuttings and volatilized oil and water, discharging the heated cuttings from the thermal treatment system, feeding the volatilized oil and water to a filter system, and filtering out fine particulates from the oil and water feeding the volatilized oil and water from the filter system to a condenser system producing a liquid stream, and feeding the liquid stream to an oil/water separator producing an oil stream and a water stream.

19. A method for remediating wellbore cuttings, the method comprising feeding a slurry of the cuttings with oil and water to a thermal treatment system and heating the slurry to produce heated cuttings and volatilized oil and water, discharging the heated cuttings from the thermal treatment system, feeding the filtered volatilized oil and water to a filter system, and filtering out fine particulates from the volatilized oil and water feeding the filtered volatilized oil and water to a condenser system producing a liquid stream, and feeding the liquid stream to an oil/water separator producing an oil stream and a water stream.

\* \* \* \* \*

UNITED STATES PATENT AND TRADEMARK OFFICE
CERTIFICATE OF CORRECTION

PATENT NO. : 6,106,733
DATED : August 22, 2000
INVENTOR(S) : Bradford R. Wood

It is certified that error appears in the above-identified patent and that said Letters Patent is hereby corrected as shown below:

IN THE ABSTRACT:
ABSTRACT, Front Page, line 8, change "an" to -- and --.

IN THE CLAIMS

Column 12,
Line 41, after "water" insert -- , --.
Line 54, before "volatilized" delete "filtered"; and
Line 59, before "volatilized" delete "filtered".

Signed and Sealed this

Seventh Day of August, 2001

Attest:

NICHOLAS P. GODICI
Attesting Officer    Acting Director of the United States Patent and Trademark Office